United States Patent [19]
Grundherr

[11] 3,858,509
[45] Jan. 7, 1975

[54] CONTROL LOGIC FOR PRINT WHEEL AND HAMMER OF HIGH SPEED PRINTING APPARATUS

[75] Inventor: Willy J. Grundherr, Sunnyvale, Calif.

[73] Assignee: Xerox Corporation, Stamford, Conn.

[22] Filed: July 10, 1972

[21] Appl. No.: 270,178

[52] U.S. Cl. .................... 101/93.19, 197/17, 197/49
[51] Int. Cl. .................... B41j 9/00
[58] Field of Search .................... 197/49, 53, 17; 235/153 AS; 340/146, 1 AJ; 101/93 C; 318/601, 602

[56] References Cited

UNITED STATES PATENTS

| | | | |
|---|---|---|---|
| 3,172,353 | 3/1965 | Holms | 101/93 C |
| 3,286,807 | 11/1966 | Decker | 197/17 |
| 3,314,360 | 4/1967 | Foster | 101/93 C |
| 3,333,089 | 7/1967 | Saylor et al. | 318/601 |
| 3,349,885 | 10/1967 | Stuiber et al. | 197/17 |
| 3,465,217 | 9/1969 | Kress | 318/601 |
| 3,623,587 | 11/1971 | Link | 197/17 |
| 3,677,387 | 7/1972 | Werterich et al. | 197/53 |
| 3,712,212 | 1/1973 | Beery | 101/93 C |
| 3,713,523 | 1/1973 | Niemietz | 197/17 |
| 3,723,824 | 3/1973 | Sather | 318/601 |

OTHER PUBLICATIONS

P. Siegal, "Understanding Digital Computers," J. Wiley & Sons Inc., New York, 1961, pgs. 46–51.

J. D. Engles, "Character Impression Control Mechanism," IBM Technical Disclosure Bulletin, Vol. 1, No. 4, 12/58, p. 44.

*Primary Examiner*—J. Reed Fisher
*Assistant Examiner*—William Pieprz

[57] ABSTRACT

Control logic for the print wheel and hammer of a high speed printing apparatus includes a read only memory containing identification words related to the sequential character position of the rotary printing wheel. These identification words are accessed by inputed ASCII characters and compared with the actual position of the print wheel to provide a difference count which drives the print wheel to its new location. The identification words of the print wheel characters are stored in two's complement format to provide for easy differencing with the actual print wheel position. Also, the identification words in read only memory contain an additional binary bit which provides information to the hammer logic unit as to whether the specific character is to be hit hard or lightly.

4 Claims, 6 Drawing Figures

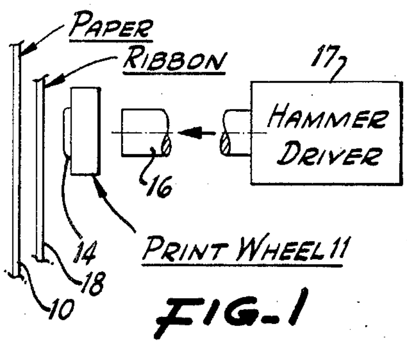
FIG. 1
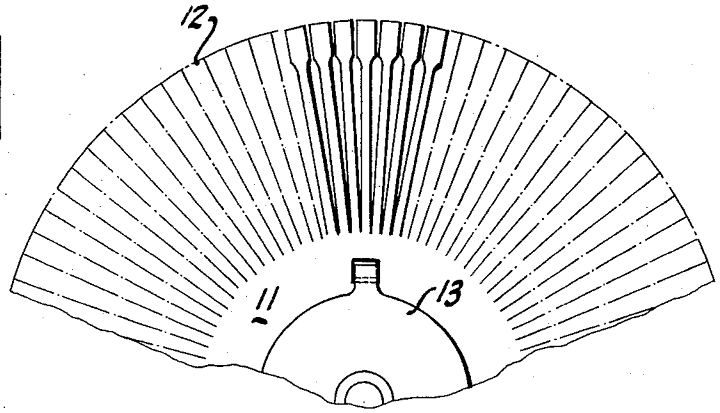
FIG. 2
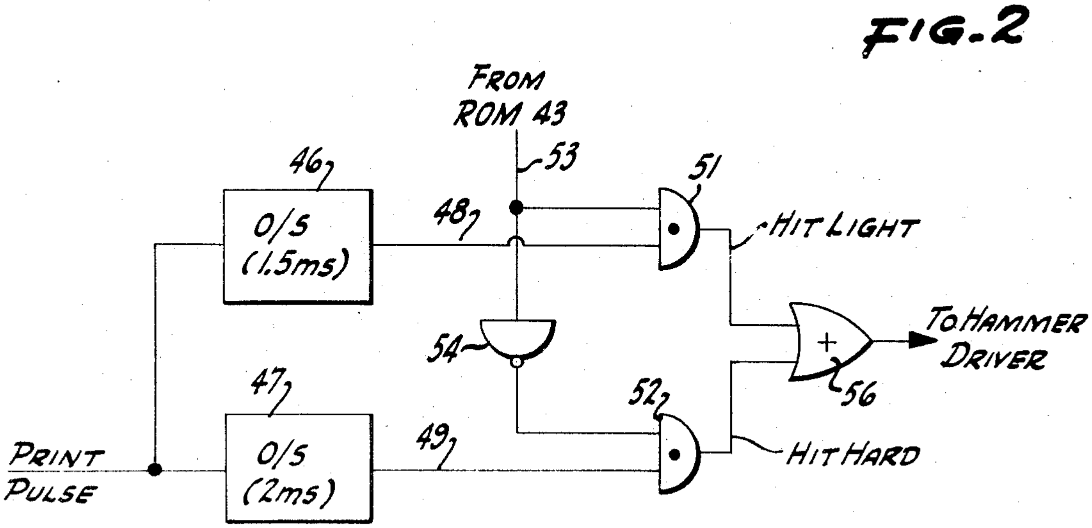
FIG. 5
| DECIMAL EQUIV. | 128 | 64 | 32 | 16 | 8 | 4 | 2 | 1 | |
|---|---|---|---|---|---|---|---|---|---|
| A | | 0 | 0 | 0 | 0 | 0 | 0 | 1 | ACTUAL POSITION |
| B | | 1 | 1 | 1 | 1 | 1 | 0 | 1 | NEW POSITION |
| C | 0 | 1 | 1 | 1 | 1 | 1 | 1 | 0 | △ COUNT (0-127) |
| D | | 1 | 1 | 0 | 0 | 0 | 0 | 0 | +96 |
| E | 1 | 1 | 0 | 1 | 1 | 1 | 1 | 0 | LEGAL △ COUNT |
| F | | | | | | | | | ↓ |
| G | | 0 | 1 | 0 | 0 | 0 | 1 | 0 | TWO'S COMP. |
| H | | 1 | 1 | 0 | 0 | 0 | 0 | 0 | +96 |
| I | | | 0 | 0 | 0 | 0 | 1 | 0 | △ COUNT ≡ 48 |
FIG. 6

Patented Jan. 7, 1975 3,858,509

3 Sheets-Sheet 2

CONTROL LOGIC FOR PRINT WHEEL AND HAMMER OF HIGH SPEED PRINTING APPARATUS

BACKGROUND OF THE INVENTION

The present invention is directed to control logic for the print wheel and hammer of a high speed printing apparatus.

In printing apparatus of the type where a rotary wheel supports a plurality of type elements on spokes radiating from the printing wheel, it is necessary to provide control logic both for rotating the wheel to the proper printing position and properly actuating an associated hammer which causes the type element to impact the record medium. More specifically, with respect to the print wheel a selected type element must be brought to a new printing position from its previous printing position. In addition, the hammer that causes the type element to impact the record medium should be sensitive to varying size type elements in order to regulate the hardness of the impact.

With respect to the latter logic requirement, prior devices have used mechanical arrangements.

In general the printing apparatus which includes the rotary wheel and hammer as described above is described and Printer in the copending application entitled "High Speed printer With Intermittent Print Wheel And Carriage Movement" in the name of Andrew Garbor, Ser. No. 229,314, filed Feb. 25, 1972, and assigned to the present assignee, and now abandoned in favor of continuing application Ser. No. 394,072, filed Sept. 4, 1973, in the name of Andrew Gabor entitled "High Speed Printer With Intermittent Print Wheel and Carriage Movement".

OBJECT AND SUMMARY OF THE INVENTION

It is an object of the present invention to provide improved control logic for the print wheel and hammer of a high speed printing apparatus.

In accordance with the above object there is provided printing apparatus for printing on a record medium and having a plurality of type elements. These elements have predetermined characters sequentially arranged. A selected element is movable to a stationary printing position in which it may be actuated to print a character on the medium. Means are provided for actuating the element. Memory means store a plurality of binary coded identification words each corresponding to one of the type elements. The words are related to the sequential physical location of the type elements. Each of the identification words includes a binary bit for indicating the hardness with which the actuating means causes a given type element to print on the record medium. The identification words are accessed out of the memory means in response to a standard input code to the memory means. Logic means is responsive to the binary bit for enabling the actuating means in accordance with the binary value of the bit.

BRIEF DESCRIPTION OF THE DRAWINGS

FIG. 1 is a cross-sectional representation in simplified format of printing apparatus illustrating the operation of the present invention;

FIG. 2 is a partial plan view of the printing wheel of FIG. 1;

FIG. 5 is a logic block diagram of the hammer logic portion of the present invention; and FIG. 6 is a table illustrating the operation of FIG. 4.

DETAILED DESCRIPTION OF THE PREFERRED EMBODIMENT

Figure 3:
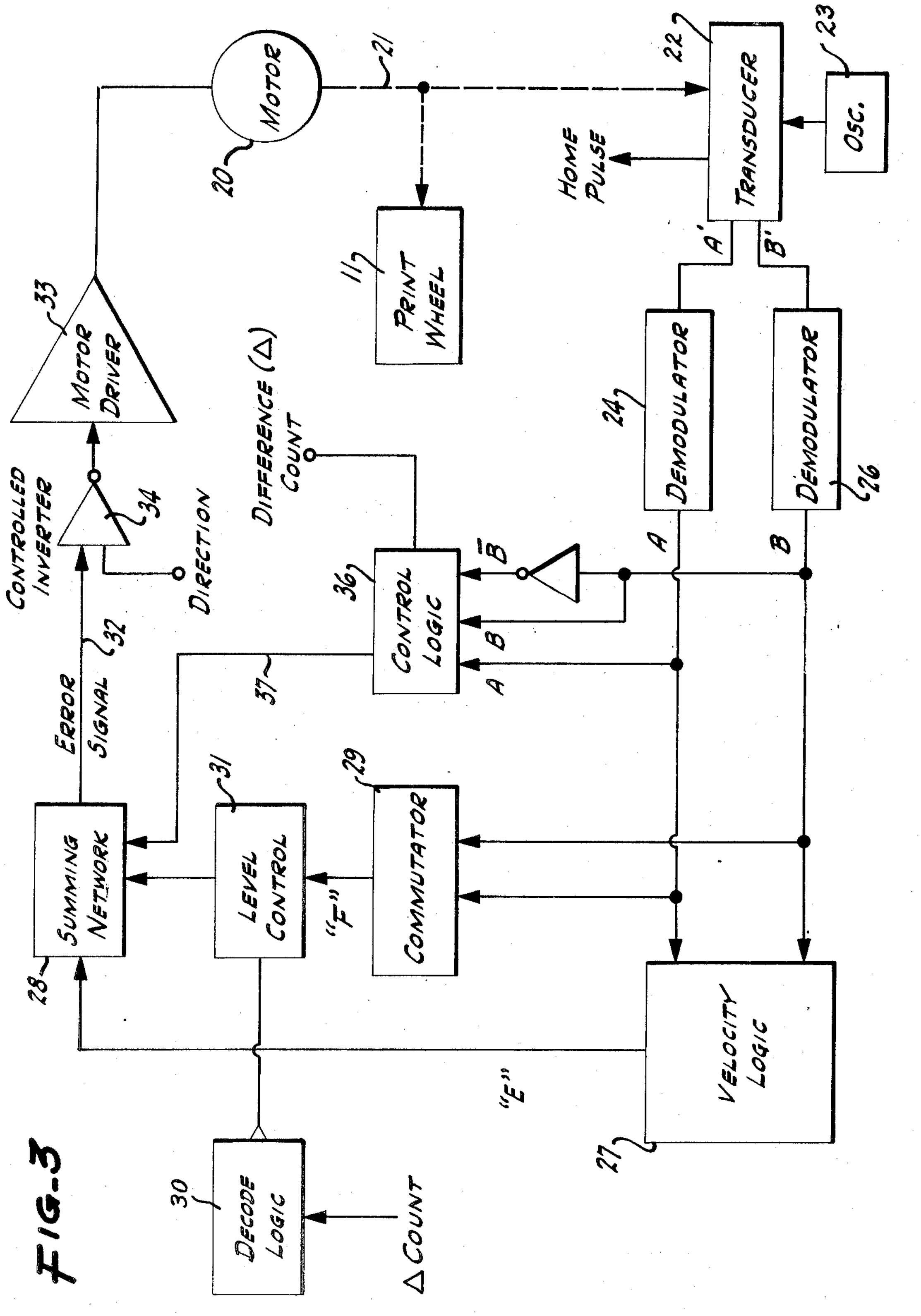
FIG. 3 is a block diagram of the circuit embodying the present invention.

All the elements illustrated in FIG. 1 except for the paper 10 are contained on a carriage (not shown) which is mounted for linear movement along the line of printing on the paper 10. The elements mounted on the carriage include a rotary wheel 11, shown in FIG. 2 as having a plurality of spokes 12 extending from a central hub 13 with each spoke carrying a type element 14 as illustrated in FIG. 1. The type elements are sequentially arranged around the wheel 11. As illustrated in FIG. 1, one of the type elements 14 is in a stationary printing position which when struck by a hammer 16 driven by a hammer driver 17 contacts a printing ribbon 18 to cause a character to be printed on paper 10. All the foregoing is more clearly shown in the foregoing Gabor patent application.

Moreover, the logic block diagram of FIG. 3 which is also shown in the above Gabor application illustrates a feedback control or servo system to drive the print wheel to its various printing positions. The print wheel is illustrated in the block 11 as being driven by a servo motor 20.

Referring in detail to FIG. 3, the motor 20 is indicated as driving a shaft 21 which is coupled to print wheel 11. Shaft 21 is also coupled to a transducer 22 which consists of a fixed and a rotary disk. In general, each disk includes deposited metallic parallel conductors with each conductor carrying current in a direction opposite to the adjacent conductor. One of the disks is coupled to the oscillator 23. Relative movement of one disk with respect to the other produces electrical interaction to produce two position signals, A' and B'. These are demodulated by demodulators 24 and 26 to produce A and B position signals. These signals are coupled to a velocity logic unit 27 to produce a velocity signal designated "E." This is derived as discussed in the above copending application from position signals A and B which are inverted, differentiated and commutated by logic unit 27. Signal E is coupled directly to a summing network 28.

A velocity reference signal "F" is also provided, as disclosed in the above application, from position signals A and B by means of a commutator unit 29 which is coupled to summing network 28 through level control unit 31. As disclosed in application Ser. No. 157,283, filed June 28, 1971, entitled "Apparatus For The Measurement Of Relative Velocity Between Two Relatively Movable Members," in the name of Andrew Gabor and assigned to the present assignee, the level control unit consists of a number of parallel field effect transistors. These are regulated by a decode logic unit 30 to control the level of the reference signal F applied to summing network 28 and therefore the speed of motor 20.

It is apparent that a difference between the reference signal F and the velocity signal level E produces an error signal on line 32 to cause a motor drive unit 33 to drive motor 20 accordingly. A controlled inverter 34 is responsive to a direction input to rotate drive motor 20 in either a clockwise or counter-clockwise direction.

In order to bring motor 20 to stop at a predetermined position to stop the print wheel at a printing position, a control logic unit 36 is provided which is coupled to the A and B position signals and also as coupled to an inverted $\bar{B}$ signal. The output line 37 of control logic unit 36 is coupled to summing network 28. A difference count, Δ, applied to control logic unit 36, will cause motor 20 to stop when it has moved a number of units corresponding to this difference count.

Figure 4:
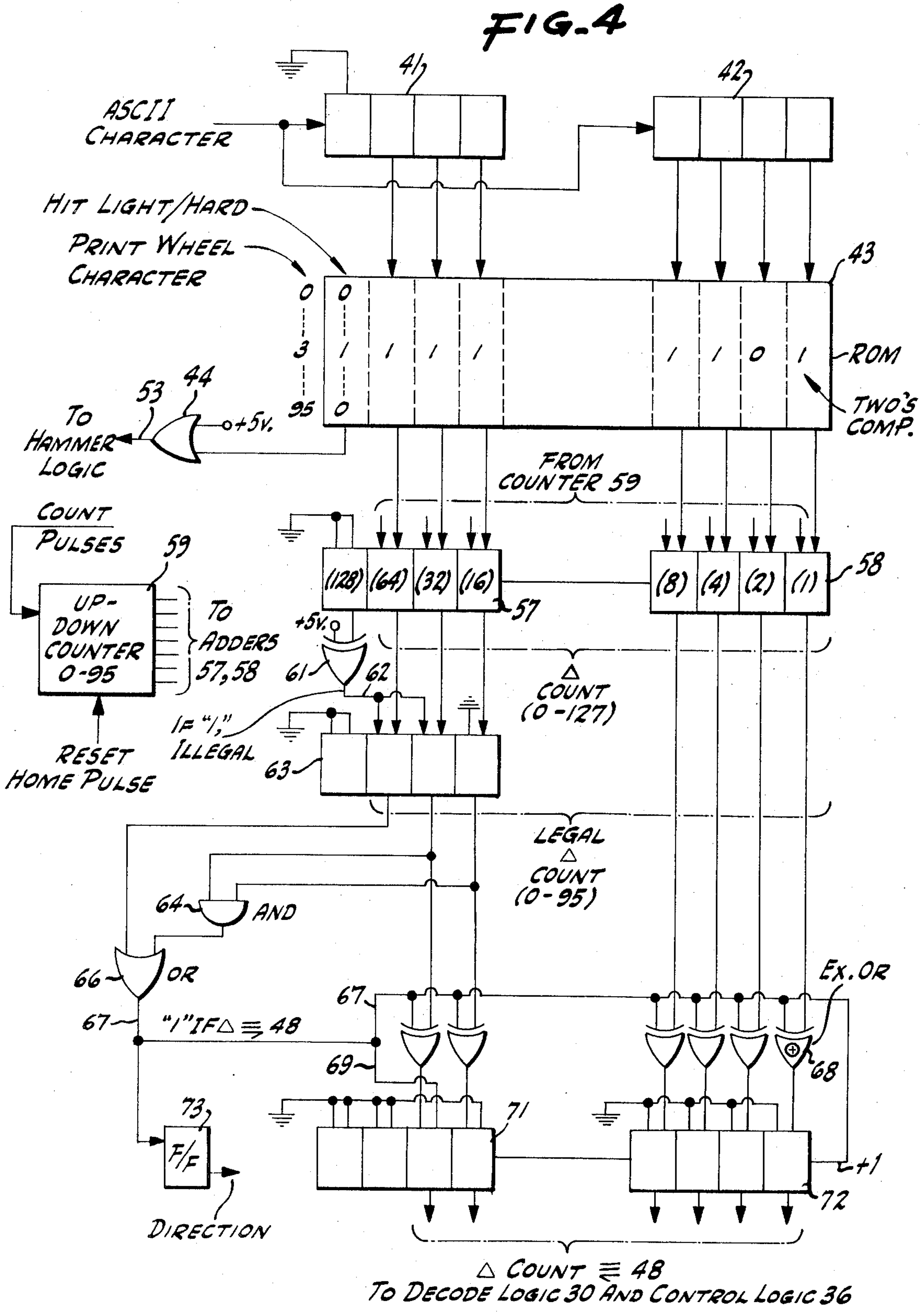
FIG. 4 is a logic block diagram embodying the present invention.

Referring now to FIG. 4, the print wheel is commanded to its new position by an ASCII character which is a standard input code which is inputed into four bit registers 41 and 42. Since the standard ASCII code is seven bits the eighth bit position of registers 41, 42 is grounded or unused. A read only memory 43 which has a size of 256 × 8 (in other words, it accommodates an eight bit word) stores binary coded identification words corresponding to the sequential physical location of each of the type elements around the print wheel. For example, in the preferred embodiment of the present invention where there are 96 print wheel characters (or 0 to 95) the read only memory 43 would store 96 seven bit words identifying these characters. Thus, for example, a position 3, as indicated, corresponds to a comma and is the fourth character around the print wheel.

Only seven bits are necessary to accommodate 96 characters since the maximum number of characters with seven bits would be 0 – 127. Thus, the most significant or eighth bit of the character identification word is used in accordance with the present invention to provide information as to whether the hammer should hit a particular character either hard or lightly. This is accommodated by the use of either a zero or one binary bit in the most significant bit location. Information in this bit location is separately accessed out of the read only memory 43 through an inverter 44 to the hammer logic illustrated in FIG. 5. The hammer logic includes a first one-shot multivibrator 46 having an on time of 1.5 milliseconds and a second one-shot multivibrator 47 having a longer on time of 2 milliseconds. Both of the multivibrators are activated by reception of a print pulse from the overall printing logic of the printing apparatus as illustrated in the first above-mentioned Gabor copending application. However, the multivibrator outputs on output lines 48 and 49 respectively are coupled into AND gates 51 and 52. The gates are activated by the bit value received from read only memory 43 on line 53 which is coupled directly to AND gate 51 but coupled to AND gate 52 through an inverter 54. Thus, the gates 51 and 52 operate in a complementary manner. The outputs of AND gates 51 and 52 represent either a hit light hammer activation with the shorter 1.5 millisecond on time or a hard hammer activation with a 2 millisecond on time. These two output lines are coupled through an OR gate 56 to the hammer driver unit 17 illustrated in FIG. 1. Thus, characters of varying sizes are accommodated to provide for uniform printing.

Referring again to FIG. 4, the remaining seven bits of the identification words for each print wheel character instead of merely being stored in a binary number equivalent to the decimal numbers 0 through 95 are stored in a two's complement format. This is illustrated in relation to the "three" print wheel character.

When an ASCII character is received by the registers 41 and 42 the corresponding identification word is read out of read only memory 43 into four bit adder units 57 and 58. The other inputs to the adder units 57, 58 is from an up/down counter 59 which is incremented by count pulses which are derived from the control logic unit 36 of FIG. 3. These pulses, of course, relate to the rotation of the print wheel and also contain direction information. Counter 59 is initially reset by a home pulse from transducer 17 (FIG. 3). Thus, the counter contains a binary number from 0 through 95 indicating the actual position of the print wheel. In order to drive the print wheel to a new printing position corresponding to the inputed ASCII character, a difference count is obtained which is coupled into the control logic unit 36 of FIG. 3 to cause the drive motor 20 to move the print wheel to the proper position. As it approaches this new position, the difference count, of course, approaches zero and the print wheel stops at its position when this count is reached. Details of the foregoing are discussed in the abovementioned copending Gabor applications and also Pat. No. 3,663,880 in the name of Andrew Gabor, entitled "Apparatus For Controlling The Relative Position Between Two Relatively Movable Members".

In accordance with the invention, this difference (or Δ) count is directly obtained by merely adding, in adders 57, 58, the identification word related to the new character to the actual sequential position of the character obtained from the counter 59. FIG. 6 illustrates the mathematical computations carried on by the logic of FIG. 4. Thus, in line A assuming the actual position indicated by counter 59 is "1" and the new position is "3," the addition of these two numbers yields on line C a difference or Δ count. However, since the binary identification word contained in read only memory 43 has a maximum value of 127 which is greater than the maximum number of print wheel characters, 0 – 95, there is a possibility that this Δ count will be an illegal number. In the example shown the equivalent decimal is 126 so therefore it is clearly illegal. Moreover, this illegality is indicated by the overflow bit being a "0" as illustrated in the most significant bit position of line C designated "128."

The zero in the overflow bit location 128 in adder 57 is coupled through an inverter 61 to indicate on output line 62 a 1 if the Δ count is illegal. Line 62 is coupled to an adder 63 which adds a decimal 96 illustrated in line D of FIG. 6 to the diference count to correct this illegality. When 96 is added the sum is illustrated on line E and becomes the legal Δ count which may range from 0 to 95. In this particular example, the decimal equivalent of the legal Δ count is 94. It is obvious that instead of adding 96, as illustrated by the adder 63 and in line D of FIG. 6, that 32 could have been subtracted to obtain the same result, since 32 when subtracted from 128 is equal to 96. However, it is much simpler from a logic point of view to use the addition technique.

As also discussed in the above-mentioned copending Gabor applications, it is desirable to rotate the print wheel the shortest distance to its new position. Since it has 96 printing positions it is obvious that if a difference count of greater than 48 is obtained that by reversing the direction of rotation, a shorter distance of rotation will be achieved. Thus, if the legal Δ count of 0 through 95 as illustrated in line E is equal to or greater than one-half the number of type elements, this number is subtracted from the total number of type elements, which is 96, and the direction of rotation of the print wheel is reversed. In the present example, the legal Δ count is 94 and that subtracted from 96 is equal to 2 which, of course, is the diference between the initial character position 1 the new character position 3. But instead of subtracting the legal Δ count from 96 this can be accomplished by converting the legal Δ count to a two's complement notation, as illustrated in line G of FIG. 6, and adding 96 as illustrated in line H with the sum being a Δ count of 2.

Referring to FIG. 4, the logic to accomplish the foregoing includes AND gate 64 and OR gate 66 which provide an indication of whether or not the legal Δ count is equal to or greater than 48. For example, AND gate 64 is responsive to the 32 and 16 bits of adder 63, their sum being 48 and OR gate 66 has an input coupled to the 64 bit position of adder 63. Thus, if a 1 appears on line 67, this indicates that the legal Δ count is equal to or greater than 48 to cause the appropriate bit addition of 96 to take place. This is accomplished by the output line 67 being coupled to the string of exclusive OR gates 68 which are also coupled to the 1, 2 4, 8 bit positions of adder 58 and to the 16, 32 bit positions of adder 63. Exclusive OR gates 68 invert these bits to provide a two's complement format. The 1 on line 67 adds the additional one for the two's complement format in the lowest bit position. The 96 is added by means of line 69 which couples the 1 on line 67 to the bit position 32 of adder 71. The four bits of the adder 72 merely serve as a register for the purpose of forming a two's complement. Since the desired output count requires only six bit positions there is actually no line coupling line 67 to the 64 bit location of adder 71 since this would be superfluous.

Thus, the output of adders 71 and 72 yields a Δ count which is less than or equal to 48. This Δ count is coupled both to the decode logic unit 30 (FIG. 3) to indicate to level control unit 31 the speed at which motor 20 should be driven and to control logic 36 for purposes of stopping. In addition, a direction of flip-flop 73 is coupled to line 67 which provides a direction input to controlled inverter 34 (FIG. 3) to drive the print wheel in the proper direction.

If the initial Δ count from adders 57 and 58 is 48 or less, then, of course, the remaining logic is not necessary. Lastly, with respect to the zero character position, since the two's complement of zero is also zero in order to facilitate the operation of the logic as described above this character is given the binary number 32.

Thus, the present invention has provided improved control logic for the printing wheel and hammer of a rotary wheel type printer which provides for efficient operation of the printing wheel and proper striking force of the hammer.

I claim:

1. Printing apparatus for printing on a record medium having a rotary wheel supporting a plurality of type elements having predetermined characters sequentially arranged around said wheel and transducer means having at least one movable member for effecting positioning of a selected type element at a stationary printing position in which a hammer is actuated to cause said selected type element to print a character on said record medium comprising: means for driving said hammer; stationary memory means for storing electronically a plurality of binary coded identification words each corresponding to one of said type elements, said words being related to the sequential physical location of said type elements around said wheel each of said identification words including a binary bit for indicating the hardness with which said hammer is to strike a selected type element, said identification words being accessed out of said memory means in response to a standard input code to said memory means for effecting positioning of said selected type element at the printing position and simultaneously providing an indication of the hardness with which the selected type element is to be struck by the hammer; and hammer logic means responsive to said binary bit for actuating said hammer driving means in accordance with the binary value of said bit.

2. Apparatus as in claim 1 where said hammer logic means includes a first and second one-shot multivibrator means having relatively long and short on times and respectively responsive to a 0 or 1 bit value to actuate said hammer driver means.

3. Printing apparatus for printing on a record medium having a rotary wheel supporting a plurality of type elements arranged sequentially around the wheel, each type element bearing a predetermined character, a print hammer adjacent said wheel and capable of being actuated to strike a selected type element when in response to control signals from a transducer having at least one movable member, the selected type element is positioned at a predetermined print location along the path of rotation of the wheel, and hammer actuating means for selectively actuating said hammer to strike said selected type element with a predetermined level of force, the improvement comprising: means for providing a plurality of unique electrical signals each identifying a particular type element and each containing force level information representative of the level of force which said particular type element is to be struck by said hammer when selected for printing and positioned at said print location in order that a substantially uniform print density is maintained among all characters printed on said record medium such means including stationary memory means, said electrical signals each comprising a unique binary coded word identifying a particular type element, each binary coded identification word being stored electronically in said memory means and being accessible out of said memory means in response to a standard input code, and each binary coded word containing a binary data component defining said force level information and accessable out of said memory means simultaneously with the remainder of the binary coded indentification word; and electrical control means responsive to the force level information contained in the electrical signal identifying a particular type element selected to be printed for causing said hammer actuating means to actuate said hammer to strike said selected type element when positioned at said print location with the level of force represented by said force level information.

4. A print density control arrangement for a printing apparatus in which selected ones of a plurality of type elements sequentially arranged around the circumference of a rotatable print member are indexed in response to control signals from a transducer means having at least one movable member to a print position for engagement by a print actuating mechanism to print a record of said type elements on a record medium comprising: stationary memory means for electronically storing a plurality of binary encoded data in the form of identification words, each of said words including elements of information separately identifiable and associated with, a particular type element on said print member, the sequential physical location of the associated type element, and the force with which said print actuating mechanism is required to engage said type element to produce a substantially uniform print density between successive print elements on the print record; means responsive to an input code for simultaneously accessing elements of information of associated identification words out of said memory means; and logic means operatively associated with said print actuating means and responsive to elements of information in said accessed identification words to energize said print actuating means with the associated force against said type element to produce a print element on said record medium having a substantially uniform print density relative to other print elements on the record medium.

* * * * *